(12) United States Patent
Wilhide et al.

(10) Patent No.: US 11,264,904 B2
(45) Date of Patent: Mar. 1, 2022

(54) ENERGY STORAGE MODULES WITH PARALLEL ENERGY STORAGE MODULE ARCHITECTURES

(71) Applicant: Hamilton Sundstrand Corporation, Charlotte, NC (US)

(72) Inventors: Matthew L. Wilhide, Cherry Valley, IL (US); Christopher J. Courtney, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 334 days.

(21) Appl. No.: 16/166,535

(22) Filed: Oct. 22, 2018

(65) Prior Publication Data

US 2020/0127568 A1 Apr. 23, 2020

(51) Int. Cl.
*H02M 3/158* (2006.01)
*B60L 58/10* (2019.01)
(Continued)

(52) U.S. Cl.
CPC ........... *H02M 3/1582* (2013.01); *B60L 58/10* (2019.02); *B60L 58/30* (2019.02); *H01M 16/003* (2013.01); *H02J 1/102* (2013.01); *H02J 1/106* (2020.01); *H02J 7/34* (2013.01); *H02M 3/158* (2013.01); *B60L 2210/12* (2013.01);
(Continued)

(58) Field of Classification Search
CPC ......... Y02E 60/10; Y02E 60/50; Y02T 10/70; Y02T 90/40; H02J 1/106; H02J 1/102; H02J 7/34; H02M 3/1852; H02M 3/1582; H02M 3/158; H01M 16/003; H01M 2220/20; B60L 11/1881; B60L 2210/12; B60L 2210/14; B60L 11/1851; B60L 58/10; B60L 58/30

USPC ................ 307/9.1, 18, 82, 43; 363/17, 1, 5; 320/103, 118, 126
See application file for complete search history.

(56) References Cited

U.S. PATENT DOCUMENTS 9,413,046 B2 8/2016 Feuerstack et al.
9,444,275 B2 9/2016 Huang et al.
(Continued)

OTHER PUBLICATIONS

Hintz, A. et al., "novel Modular Multiple-Input Bidirectional DC-DC Power Converter(MIPC) for HEV/FCV Applica", IEEE Trans on Industrial Electronics, IEEE Service Center, Piscataway, NJ, USA, vol. 62, No. 5, May 6, 2015 pp. 3163-3172, XPO 11577608, ISSN: 0278-0046, DOI:10.1109/TIE.2014.2371778(Year: 2015).*

(Continued)

*Primary Examiner* — Arnold M Kinkead
(74) *Attorney, Agent, or Firm* — Locke Lord LLP; Scott D. Wofsy; Judy R. Naamat

(57) ABSTRACT

An energy storage module (ESM) assembly, ESM and method of balancing current flow on a direct current bus are provided. The ESM assembly includes a bidirectional DC-DC converter, an ESM having first and second energy cell strings connected in parallel relative to one another and configured to be connected to respective inputs of the bidirectional DC-DC converter. The ESM is configured to absorb current from the bidirectional DC-DC converter when the bidirectional DC-DC converter is operated in a buck mode. The ESM is configured to source current to the bidirectional DC-DC converter when the bidirectional DC-DC converter is operated in a boost mode.

20 Claims, 4 Drawing Sheets

(51) Int. Cl.
  *B60L 58/30*      (2019.01)
  *H01M 16/00*      (2006.01)
  *H02J 7/34*       (2006.01)
  *H02J 1/10*       (2006.01)

(52) U.S. Cl.
  CPC ...... *B60L 2210/14* (2013.01); *H01M 2220/20* (2013.01); *Y02E 60/10* (2013.01); *Y02E 60/50* (2013.01); *Y02T 10/70* (2013.01); *Y02T 90/40* (2013.01)

(56) References Cited

U.S. PATENT DOCUMENTS

| | | | |
|---|---|---|---|
| 9,698,720 | B2 | 7/2017 | Hawliczek et al. |
| 10,892,682 | B2* | 1/2021 | Dilley .................. H02M 7/797 |
| 2012/0043923 | A1* | 2/2012 | Ikriannikov .............. H02J 1/10 320/103 |
| 2012/0228947 | A1* | 9/2012 | Noy .......................... H02J 7/35 307/80 |
| 2013/0038289 | A1* | 2/2013 | Tse ...................... H02M 3/1584 320/118 |
| 2014/0368041 | A1 | 12/2014 | Tu et al. |
| 2017/0047155 | A1 | 2/2017 | Yao et al. |
| 2017/0310205 | A1 | 10/2017 | Coleman et al. |
| 2018/0041028 | A1* | 2/2018 | Wilhide .................... H02J 1/00 |
| 2018/0212520 | A1 | 7/2018 | Zhang et al. |

OTHER PUBLICATIONS

Extended European Search Report for European Patent Application No. EP19204367.7, dated Dec. 16, 2019.

Kannan, K.A., et al: "A Bidirectional Multiport DC-DC Converter Topology for Hybrid Energy System", 2017 International Conference on Energy, Communication, Data Analytics and Soft Computing (ICECDS), IEEE, Aug. 2, 2017 (Aug. 2, 2017), pp. 3427-3432, XP033360410, DOI: 10.1109/ICECDS.2017.8390097.

Hintz, A., et al: "Novel Modular Multiple-Input Bidirectional DC-DC Power Converter (MIPC) for HEV/FCV Applica", IEEE Transactions on Industrial Electronics, IEEE Service Center, Piscataway, NJ, USA, vol. 62, No. 5, May 5, 2015 (May 5, 2015), pp. 3163-3172, XP011577608, ISSN: 0278-0046, DOI: 10.1109/TIE.2014.2371778.

Zheng, H., et al: "A Control Strategy of Hybrid Energy Storage System in Bipolar-Type DC Micro-Grid", 2017 IEEE Conference on Energy Internet and Energy System Integration (EI2), IEEE, Nov. 26, 2017 (Nov. 26, 2017), pp. 1-6, XP033288331, DOI: 10.1109/EI2.2017.8245594.

\* cited by examiner

US 11,264,904 B2

ENERGY STORAGE MODULES WITH PARALLEL ENERGY STORAGE MODULE ARCHITECTURES

BACKGROUND OF THE INVENTION

1. Field of the Invention

The present disclosure relates to electrical systems, and more particularly to electrical systems employing energy storage modules with parallel energy storage module architectures.

2. Description of Related Art

Vehicles such as aircraft commonly include electrical systems with on-board generator that converts rotational movement within the engines to electrical power. This power is then provided to the electrical loads on the aircraft. During normal operation, the electrical systems on a vehicle can be required to support a variety of electrical transients. These transients may have relatively high slew rates that can significantly impact the power quality of the electrical bus or the performance of the engine providing power to the electrical system.

To compensate for these high slew rate loads, energy storage modules are used to smooth voltage changes from loads connecting and disconnecting from the system. These energy storage modules generally include a stack of low voltage energy cells, i.e., energy cells with a voltage lower than the bus to which the energy cells provide power.

Such conventional methods and systems have generally been considered satisfactory for their intended purpose. However, there is still a need in the art for improved energy storage modules, electrical systems, and methods of controlling voltage on direct current buses. The present disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the assemblies, modules, and methods particularly pointed out in the written description and claims hereof, as well as from the appended drawings. To achieve these and other advantages and in accordance with the purpose of the illustrated embodiments, in one aspect, disclosed is an energy storage module (ESM) assembly. The ESM assembly includes a bidirectional DC-DC converter, an ESM having first and second energy cell strings connected in parallel relative to one another and configured to be connected to respective inputs of the bidirectional DC-DC converter. The ESM is configured to absorb current from the bidirectional DC-DC converter when the bidirectional DC-DC converter is operated in a buck mode. The ESM is configured to source current to the bidirectional DC-DC converter when the bidirectional DC-DC converter is operated in a boost mode.

In embodiments, at least one of the first and second energy cell strings can include a plurality of energy cells selected from a group including fuel cells, batteries, and capacitors.

In embodiments, the fuel cells included in the respective at least one of the first and second energy cell strings can still be connected in series with one another.

In embodiments, the ESM can further include a negative terminal and a first and second positive terminal. The first energy cell can be connected between the negative terminal and the first positive terminal, and the second energy cell can be connected between the negative terminal and the second positive terminal.

In embodiments, the first and second energy cell strings can include mid-size ultracapacitors.

In embodiments, the ultracapacitors can be mounted on a printed circuit board assembly. In embodiments, when the bidirectional DC-DC converter is operated in the buck mode, the ESM can be configured to absorb the current via the first and second energy cell strings, and when the bidirectional DC-DC converter is operated in the boost mode, the ESM can be configured to source the current via the first and second energy cell strings.

In embodiments, the bi-directional DC/DC converter can include a buck/boost circuit connected to each of the first and second energy cell strings. The buck/boost circuit can be configured to operate in the buck mode or the boost mode. When operating in the buck mode, the buck/boost circuit can be configured to cause the ESM to absorb the current from the bidirectional DC-DC converter, and when operating in the boost mode, the buck/boost circuit can be configured to cause the ESM to source current to the bidirectional DC-DC converter.

In embodiments, the bi-directional DC/DC converter includes an interphase transformer that operates on current output by the buck/boost circuit.

In embodiments, the bi-directional DC/DC converter can include an inductor connected to the interphase transformer and coupled to a DC bus.

In embodiments, the bi-directional DC/DC converter can includes a first phase leg connected to the first energy cell string, and a second phase leg connected to the second energy cell string. Each of the first and second phase legs can include first and second solid-state switch devices.

In embodiments, the first and second solid-state switch devices of the first and second phase legs can be controlled to cause the bidirectional DC-DC converter to selectively operate in the boost mode or the buck mode.

In embodiments, the ESM assembly can further include a power filter coupled between the first and second energy cell strings and a DC bus.

In embodiments, the DC bus can includes a positive rail and a neutral rail, wherein the at least one positive terminal of the ESM can be coupled to either the positive or negative rail, and the negative terminal of the ESM can be connected to the neutral rail.

In another aspect of the disclosure an ESM is provided. The ESM includes first and second energy cell strings connected in parallel relative to one another and configured to be connected to respective inputs of a bidirectional DC-DC converter. The first and second energy cell strings are configured to absorb current from the bidirectional DC-DC converter when the bidirectional DC-DC converter operates in a buck mode. The first and second energy cell strings are configured to source current to the bidirectional DC-DC converter when the bidirectional DC-DC converter operates in a boost mode.

In a further aspect of the disclosure, a method of balancing current flow on a direct current bus is provided. The method includes coupling first and second energy cell strings of an ESM to respective first and second phase legs of a bidirectional DC-DC converter, wherein the first and second energy cell strings are coupled in parallel relative to one another. The method further includes controlling switching devices of the first and second phase legs to operate in either a boost mode or a buck mode, absorbing current in the ESM from the bidirectional DC-DC converter when the bidirectional DC-DC converter is operated in the buck mode, and sourcing current from the ESM to the bidirectional DC-DC converter when the bidirectional DC-DC converter is operated in the boost mode.

In embodiments, at least one of the first and second energy cell strings can include a plurality of energy cells selected from a group including fuel cells, batteries, and capacitors.

In embodiments, the fuel cells included in the respective at least one of the first and second energy cell strings can be connected in series with one another.

In embodiments, the first energy cell string can include a plurality of energy cells connected in series with one another, wherein the second energy cell string can include a plurality of energy cells connected in series with one another, and wherein each of the energy cells can be mounted on a printed circuit board assembly.

In embodiments, each of the energy cells can include a mid-size ultracapacitor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
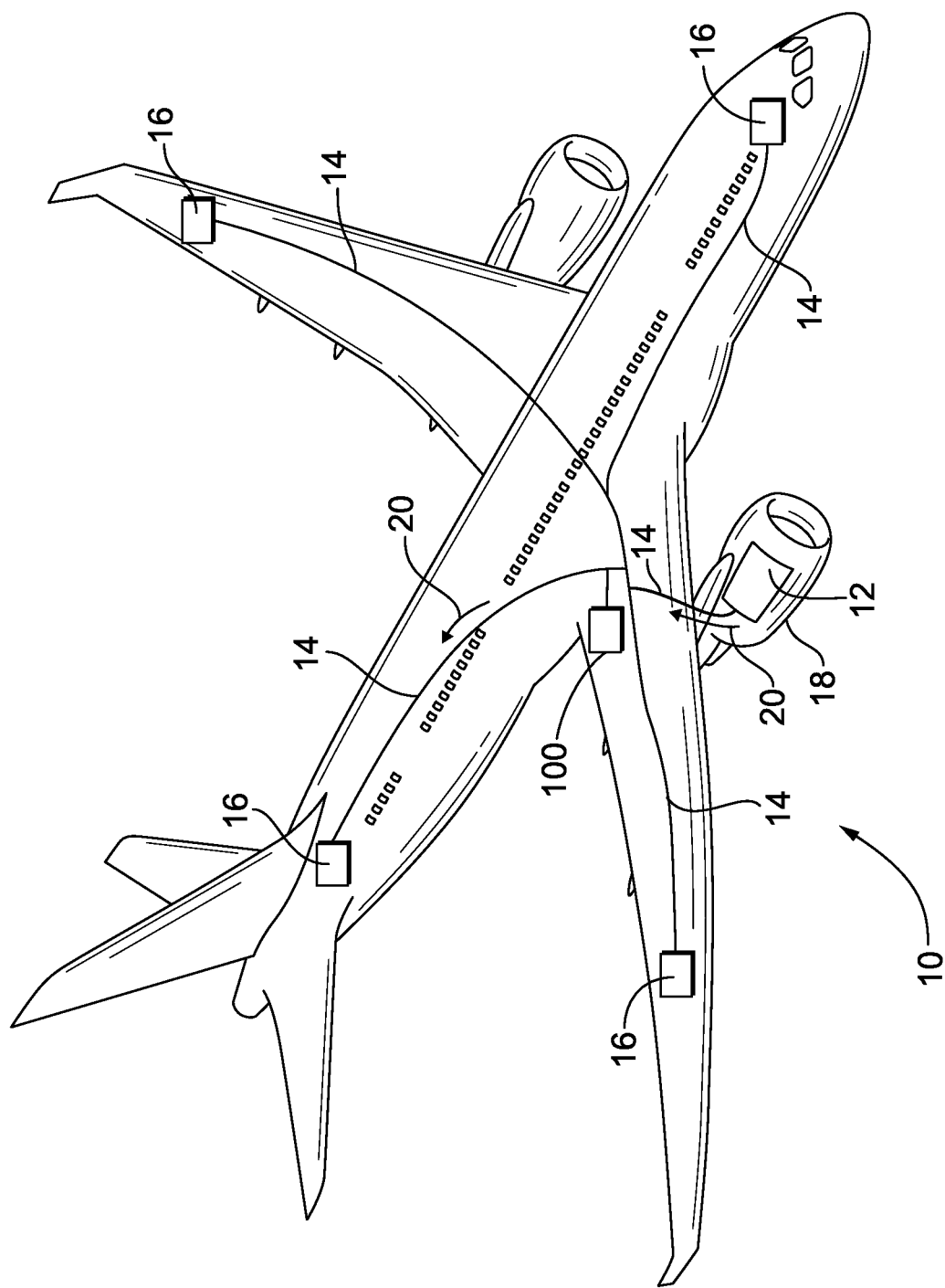
FIG. 1 is a schematic view of an exemplary embodiment of an energy storage module (ESM) assembly constructed in accordance with the present disclosure, showing the ESM assembly connected to a direct current (DC) bus in an aircraft electrical system.

Reference will now be made to the drawings wherein like reference numerals identify similar structural features or aspects of the subject disclosure. For purposes of explanation and illustration, and not limitation, a partial view of an exemplary embodiment of an energy storage module (ESM) assembly in accordance with the disclosure is shown in FIG. 1 and is designated generally by reference character 100. Other embodiments of ESM assemblies and methods of regulating current flow on direct current (DC) bus in accordance with the disclosure, or aspects thereof, are provided in FIGS. 2-4, as will be described. The systems and methods described herein can be used for regulating current flow on high voltage DC buses, such as in aircraft electrical systems, though the present disclosure is not limited to high voltage DC buses or to aircraft electrical systems in general.

Referring to FIG. 1, an electrical system 10, e.g., an aircraft electrical system is shown. Electrical system 10 includes a generator 12, a power bus 14, and electrical loads 16. Generator 12 is operably associated with an engine 18, e.g., an aircraft main engine or auxiliary power unit, and is arranged to provide a flow of electrical power 20 to power bus 14. Power bus 14 is connected to respective power-consuming devices 16 to provide electrical power 20 to electrical loads 16. ESM assembly 100 is disposed in electrical communication with power bus 14 and is configured to and adapted to be charged by and discharged from power bus 14. Although an aircraft electrical system is shown and described herein it is to be understood and appreciated that other types of electrical systems can also benefit from the present disclosure.

Figure 2:
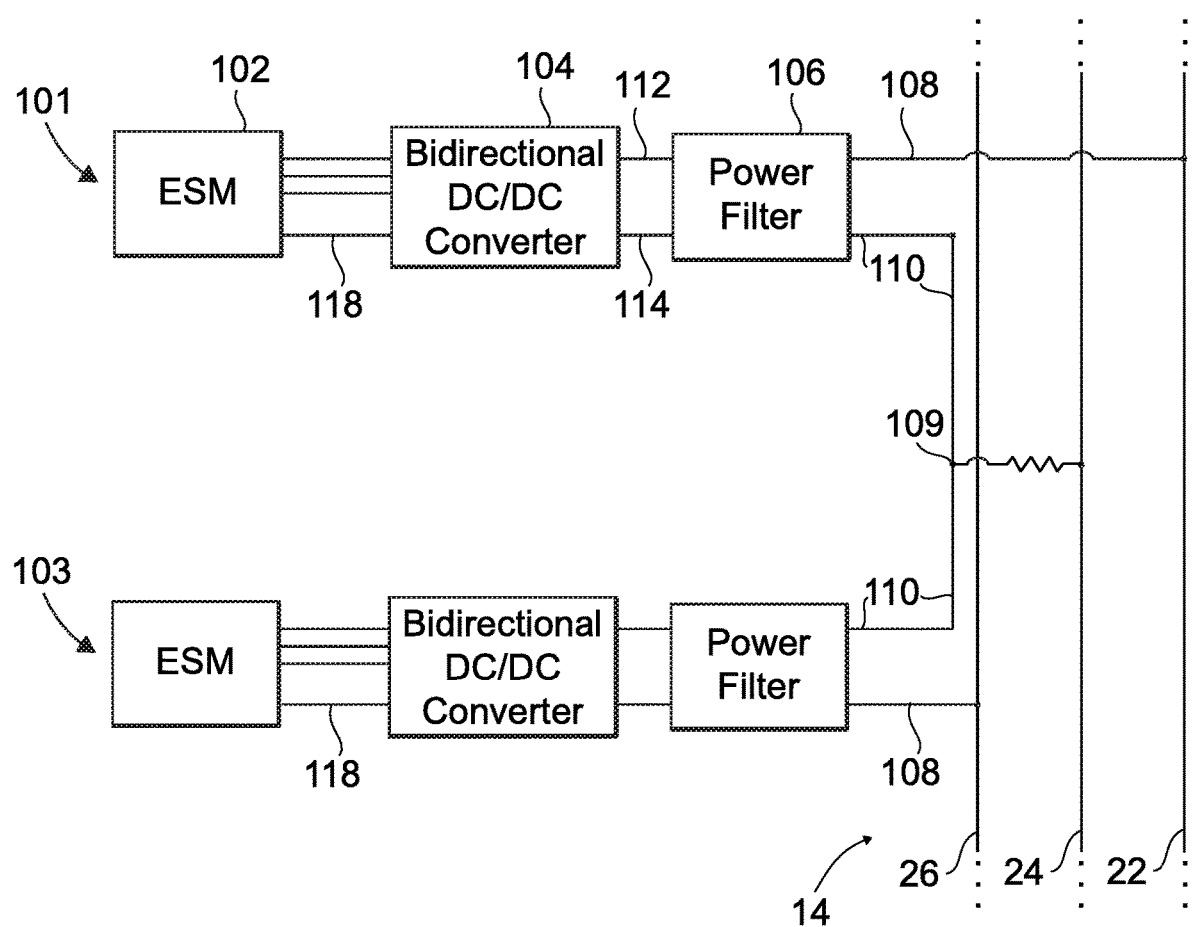
FIG. 2 is a schematic view of the ESM assembly of FIG. 1, showing ESMs connected to the DC bus.

With additional reference to FIG. 2, ESM assembly 100 and power bus 14 are shown. As shown and described herein power bus 14 is a DC power bus and includes a positive rail 22, a neutral rail 24, and a negative rail 26. Positive rail 22, neutral rail 24, and negative rail 26 connect one or more of electrical load 16 with generator 12 to provide DC power 20. It is contemplated that DC power bus 14 be a high voltage DC power bus, e.g., +/−270 volts or higher (e.g., +/−300 volts for ground vehicles), with the positive voltage provided on the positive rail 22, the negative voltage provided on the negative rail 26, and the neutral rail 24 being 0 volts.

ESM assembly 100 includes an energy storage module 102, a bi-directional DC/DC converter 104, and a power filter 106. Power filter 106 is connected to power bus 14. Power bus 14 includes a positive rail 26, a negative rail 22, and a neutral rail 24. More particularly a positive output filter conductor of power filter 106 is connected to positive rail 22 by a filter source lead 108 and a negative output filter conductor of power filter 106 is connected to neutral rail 24 by a filter return lead 110. A positive output converter conductor 112 of bi-directional DC/DC converter 104 is connected to a node (shown in FIG. 3 as node 148) of power filter 106 by a positive output converter conductor 112, and a negative converter conductor 118 of bi-directional DC/DC converter 104 is connected to a node (shown in FIG. 3 as node 158) of power filter 106.

One or more positive ESM terminals (shown in FIG. 3 as positive ESM terminals 126a, 126b, 126c) of ESM 102, each representing a phase, are connected to one or more respective positive input converter conductors 116 of bi-directional DC/DC converter 104. Three phases are shown in the example ESM assembly 100 shown in FIG. 2, however in embodiments, there is at least one phase, without limitation to a particular number of phases, as suitable for an intended application. A singular negative ESM terminal (shown in FIG. 3 as negative ESM terminal 122) is connected to a negative converter conductor 118. ESM 102 can include, for example and without limitation, a battery or an ultracapacitor, or a hybrid of energy storage technologies.

ESM 102 can include, for example and without limitation, a battery or an ultracapacitor, or a hybrid of energy storage technologies. ESM assembly 100 includes one or more ESM subassemblies, providing a modular architecture. In the example shown in FIG. 2, ESM assembly 100 includes a first ESM subassembly 101 coupled to positive rail 22 and neutral rail 24 and a second ESM subassembly 103 coupled to neutral rail 24 and negative rail 26. ESM subassembly 103 is the same as described above, except that its filter source lead 108 is coupled to negative rail 26. The filter return leads 110 of the first and second ESM subassemblies 101 and 103 are connected in series, e.g., at node 109. The filter return leads 100, e.g., at node 109, are coupled via a resistor 111 to neutral rail 24. Resistor 111 can be a high impedance resistor.

Figure 3:
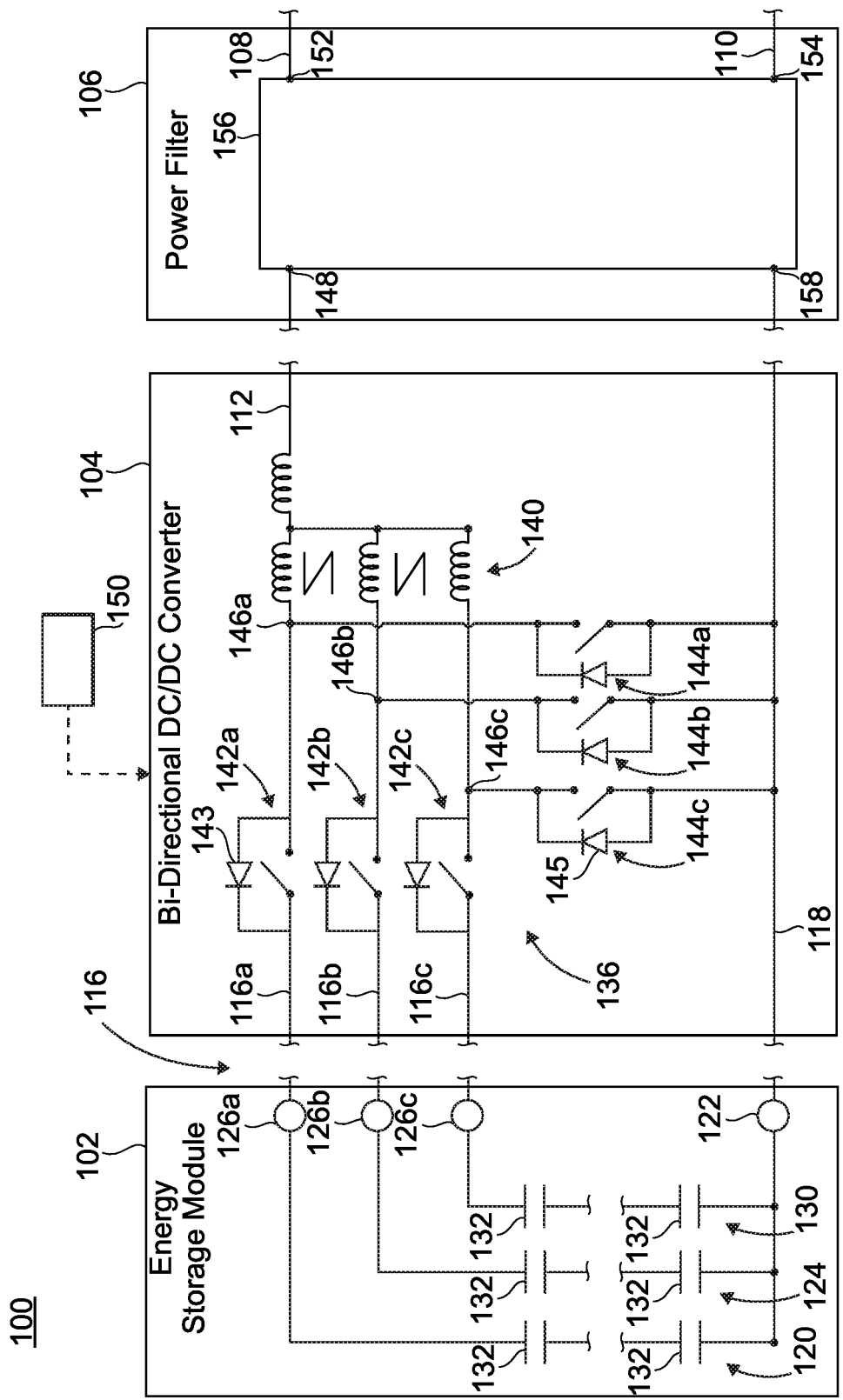
FIG. 3 is a detailed schematic view of the ESM of FIG. 1, showing the circuit elements of the ESM assembly.

As will be appreciated by those of skill in the art in view of the present disclosure, ESMs typically have a voltage that is below the bus voltage to which the ESM is coupled. While generally satisfactory for its intended purpose, thermal losses can result due to an ESM that is operating at lower voltages, which can be prohibitive—particularly in electrical systems having high peak power demands. To reduce the thermal losses in ESM 102, ESM assembly 100 includes a parallel ESM architecture which, as shown in FIG. 3, includes a sufficient number of paralleled energy cells within ESM 102 that in combination have a cell stack voltage that can be boosted above that of the voltage of bus 14. As will be appreciated by those of skill in the art in view of the present disclosure, this reduces the current each of the energy cells provides to power bus 14. Further, in accordance with certain embodiments, this allows for the energy cells to be mounted on a common circuit board, simplifying ESM assembly 100.

With reference to FIG. 3, an example ESM sub-assembly 101 is shown in greater detail. ESM sub-assembly 101 includes first, second and third energy cell strings 120, 124, and 130 associated with each of the phases. First energy cell string 120 is connected between negative ESM terminal 122 and a first positive ESM terminal 126a. Second energy cell string 124 is connected between negative ESM terminal 122 and a second positive ESM terminal 126b in parallel with the first energy cell string 122. Third energy cell string 130 is connected between negative ESM terminal 122 and a third positive ESM terminal 126c in parallel with the first and second energy cell strings 122 and 124.

ESM input converter conductors 116 include a first, second, and third input converter conductors 116a, 116b, and 116c, respectively. First input converter conductor 116a is connected to first positive ESM terminal 126a. Second input converter conductor 116b is connected to second positive ESM terminal 126b. Third input converter conductor 116c is connected to third positive ESM terminal 126c. Each energy cell string 120, 124, 130 includes two or more energy cells 132. The combination of voltage of each of the energy cells 132 in each of energy cell strings 120, 124, 130 determines a cell stack voltage for that energy cell string. Each energy cell string 120, 124, 130 can have the same number of energy cells 132 in order to have balanced current flowing through the bi-directional DC/DC converter 104. Energy cells 132 are connected in series with one another between negative ESM terminal 122 and the corresponding positive ESM terminal 126a, 126b, 126c. In certain embodiments energy cells 132 are fuel cells. In accordance with certain embodiments energy cells 132 are batteries. It is also contemplated that energy cells 132 can be capacitors, such as ultracapacitors. In this respect, energy cells 132 can be mid-size ultracapacitors, e.g., capacitors having a capacitance in the range of 1 farad to about 500 farads. Notably, ultracapacitors in this range allows energy cells 132 to be mounted to a printed circuit board assembly, simplifying ESM assembly 100.

Bi-directional DC/DC converter 104 includes a buck/boost circuit 136. The buck/boost circuit 136 causes the bi-directional DC/DC converter 104 to regulate current from the ESM 102 by "bucking" (reducing) the voltage at the bi-directional DC/DC converter 104 when supplying power to the bus 14, and by "boosting" (increasing) the voltage at the bi-directional DC/DC converter 104 when absorbing power from the bus 14. Bucking the voltage includes absorbing power from the bus 14 by the first, second, and third energy cell strings 120, 124, 130 of the ESM 102. Boosting the voltage includes sourcing the power from the bus 14 to the ESM 102 via the first, second, and third energy cell strings 120, 124, 130. Buck/boost circuit 136 includes an inductor 138, an interphase transformer 140, a plurality of first switching devices, such as phase solid-state switch devices 142a-142c, and a plurality of second switching devices, such as second solid-state switch devices 144a-144c. In embodiments, second solid-state switch devices 144a-144c can be cross-connect devices.

Buck/boost circuit 136 includes three phase legs. A first phase leg connects between first input converter conductor 116a and negative converter conductor 118, and includes first and second phase solid-state switch devices 142a and 144a, connected in series with its endpoints. A first node 146a is provided between first and second phase solid-state switch devices 142a and 144a. A second phase leg connects between second input converter conductor 116b and negative converter conductor 118, and includes first and second phase solid-state switch devices 142b and 144b, connected in series with its endpoints. A second node 146b is provided between first and second phase solid-state switch devices 142b and 144b. A third phase leg connects between third input converter conductor 116c and negative converter conductor 118, and includes first and second phase solid-state switch devices 142c and 144c, connected in series with its endpoints. A third node 146c is provided between first and second phase solid-state switch devices 142c and 144c.

Each of first phase solid-state switch devices 142a-142c is provided with a diode 143 disposed in parallel with the corresponding switch 142. Each of second phase solid-state switch devices 144a-144c is provided with a diode 145 disposed in parallel with the corresponding switch 144.

A controller 150 controls the first and second phase solid-state switch devices 142a-142c and 144a-144c to regulate the bus voltage, e.g., by pulse width modulation (PWM). When the bus voltage is determined to be below a low threshold, controller 150 commands current to be sourced from the ESM 102 by operating in a boost mode based on a difference between the bus voltage and the low threshold. When the bus voltage is determined to be above a high threshold, controller 150 commands current to be absorbed into the ESM 102 by operating in a buck mode based on a difference between the bus voltage and the high threshold. The current can be absorbed into the ESM 102 via the first, second, and third energy cell strings 120, 124, 130.

The controller can be implemented using, for example a voltage regulator and a control unit that includes, for example, a microcontroller, field programmable gate array (FPGA), or application specific integrated circuit (ASIC). The control unit is configured to control the PI voltage regulator for maintaining a predetermined bus voltage. Output of the voltage regulator can be a current command for each phase leg of the bi-directional DC/DC converter 104. The current command can be regulated by the control unit using, for example, a fixed frequency hysteresis current regulator.

With reference to the first phase leg, when bucking, controller 150 turns on first phase solid-state switch device 142a to drive the current, and turns off second phase solid-state switch devices 142a. When second phase solid-state switch device 142a is controlled to open, current continues to flow through diode 145. Conversely, when boosting, controller turns on second phase solid-state switch device 144a to drive the current, and turns off first phase solid-state switch devices 144a. When first phase solid-state switch device 142a is controlled to open, current continues to flow through diode 143. Interphase transformer 140 is connected by parallel couplings to nodes 146a, 146b, and 146c to balance current flow from each of the energy cell strings with respect to the other of the energy cell strings, e.g., first energy cell string 120 in relation to second energy cell string 124 and third energy cell string 130. In embodiments, a common node of the parallel couplings is connected to inductor 138.

Power filter 106 includes a filter circuit 156 that is configured to filter power flowing to/from positive output converter conductor 112 at node 148 and negative converter conductor 118 at node 158. The filter circuit is further configured to filter power flowing from/to bus 14 to/from node 152 via filter source lead 108 and to/from node 154 via filter return lead 110.

The positive ESM terminals 126a-126c are coupled to either the positive rail 22 or negative rail 26 of the power bus 14. The coupling can be via first, second, and third input converter conductors 116a, 116b, and 116c, interphase transformer 140, inductor 138, and/or power filter 106. The negative terminal 122 of the ESM 102 is coupled to the neutral rail 24 of the power bus 14, wherein the coupling can be via negative converter conductor 118 and/or power filter 106.

Figure 4:
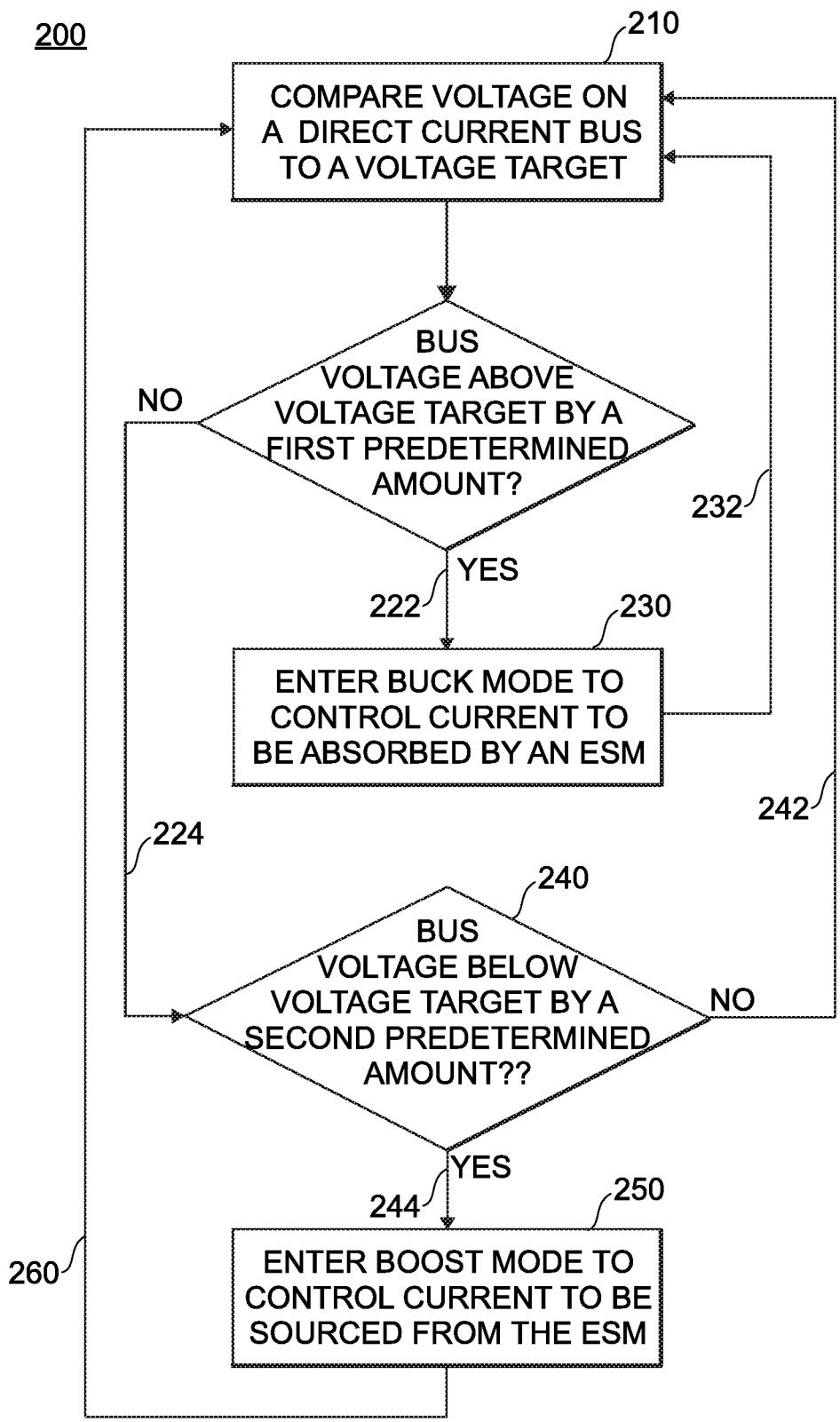
FIG. 4 is a block diagram of a method of balancing current flow to and from a DC link using an ESM assembly, showing the steps of the method.

With reference to FIG. 4, a method 200 of regulating voltage on a DC bus, e.g., DC bus 14 (shown in FIG. 1), is shown. Method 200 includes comparing voltage on the DC bus to a DC bus voltage target, as shown by box 210. When a determination is made that the bus voltage is above the voltage target by a first predetermined amount, the method continues at box 230, as shown by decision box 220 and arrow 222. At box 230, a buck mode is entered in which a command is generated to control current to be absorbed by an ESM, such as ESM 102 shown in FIG. 3. Causing the current to be absorbed by the ESM can be performed, for example, based on a difference between the bus voltage and the target voltage. The absorbing of current can continue until the bus voltage returns within a predetermined range defined by the first predetermined amount and the voltage target, as shown by arrow 232.

When the bus voltage comparison at box 220 indicates that the bus voltage is not above the voltage target by the first predetermined amount, a determination is made as to whether the bus voltage is below the target voltage by a second predetermined amount, as shown by arrow 224 and decision box 240. If the comparison at decision box 240 indicates that the bus voltage is not below the voltage target by the second predetermined amount, then bus voltage monitoring continues, as shown by arrow 242. When the comparison at decision box 240 indicates that the bus voltage is below the voltage target by the second predetermined amount, a boost mode is entered in which a command is generated to source current from the ESM, e.g., via the first, second, and third energy cell strings 120, 124, 130. Sourcing the current from the ESM can be performed, for example, based on a difference between the bus voltage and the target voltage. The sourcing of the current can continue until the bus voltage returns to within a predetermined range defined by the first and second predetermined amounts, as shown by arrow 260.

The methods and systems of the present disclosure, as described above and shown in the drawings, provide for ESM assemblies with superior properties including reduced current and thermal losses, reduced cost from the use of printed circuit board mounted energy cells, and/or relatively compact and lightweight assemblies. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An energy storage module (ESM) assembly, comprising:
a bidirectional DC-DC converter having an interphase transformer; and
an ESM having:
first and second energy cell strings connected in parallel relative to one another and configured to be connected to respective inputs of the bidirectional DC-DC converter;
wherein the ESM is configured to absorb current from the bidirectional DC-DC converter via the first and second energy cell strings when the bidirectional DC-DC converter is operated in a buck mode,
the ESM is configured to source current to the bidirectional DC-DC converter via the first and second energy cell strings when the bidirectional DC-DC converter is operated in a boost mode, and
wherein the interphase transformer operates to balance current output by or input to the first and second energy cell strings.

2. The ESM assembly as recited in claim 1, wherein at least one of the first and second energy cell strings include a plurality of energy cells selected from a group including fuel cells, batteries, and capacitors.

3. The ESM assembly as recited in claim 1, wherein fuel cells included in the respective at least one of the first and second energy cell strings are connected in series with one another.

4. The ESM assembly as recited in claim 1, wherein the first and second energy cell strings include mid-size ultracapacitors.

5. The ESM assembly as recited in claim 4, wherein the ultracapacitors are mounted on a printed circuit board assembly.

6. The ESM assembly as recited in claim 1, wherein when the bidirectional DC-DC converter is operated in the buck mode, the ESM is configured to absorb the current via the first and second energy cell strings, and
when the bidirectional DC-DC converter is operated in the boost mode, the ESM is configured to source the current via the first and second energy cell strings.

7. The ESM assembly as recited in claim 6, wherein the bi-directional DC/DC converter includes a buck/boost circuit connected to each of the first and second energy cell strings, the buck/boost circuit being configured to operate in the buck mode or the boost mode, wherein when operating in the buck mode, the buck/boost circuit is configured to cause the ESM to absorb the current from the bidirectional DC-DC converter, and when operating in the boost mode, the buck/boost circuit is configured to cause the ESM to source current to the bidirectional DC-DC converter.

8. The ESM assembly as recited in claim 6, wherein the bi-directional DC/DC converter includes an interphase transformer that operates on current output by the buck/boost circuit.

9. The ESM assembly as recited in claim 8, wherein the bi-directional DC/DC converter includes an inductor connected to the interphase transformer and coupled to a DC bus.

10. The ESM assembly as recited in claim 1, wherein the bi-directional DC/DC converter includes a first phase leg connected to the first energy cell string, and a second phase leg connected to the second energy cell string, each of the first and second phase legs comprising first and second solid-state switch devices.

11. The ESM assembly as recited in claim 10, wherein the first and second solid-state switch devices of the first and second phase legs are controlled to cause the bidirectional DC-DC converter to selectively operate in the boost mode or the buck mode.

12. An energy storage module (ESM) assembly, comprising:
    a bidirectional DC-DC converter;
    an ESM having:
        first and second energy cell strings connected in parallel relative to one another and configured to be connected to respective inputs of the bidirectional DC-DC converter; and
        a negative terminal and a first and second positive terminal, the first energy cell string being connected between the negative terminal and the first positive terminal, and the second energy cell string being connected between the negative terminal and the second positive terminal; and
    a power filter coupled between the first and second energy cell strings and a DC bus,
    wherein the ESM is configured to absorb current from the bidirectional DC-DC converter when the bidirectional DC-DC converter is operated in a buck mode, and
    the ESM is configured to source current to the bidirectional DC-DC converter when the bidirectional DC-DC converter is operated in a boost mode; and
    an interphase transformer to balance current output by or input to the first and second energy cell strings.

13. The ESM assembly as recited in claim 12, wherein the DC bus includes a positive rail and a neutral rail, the at least one positive terminal of the ESM being coupled to either the positive or negative rail, the negative terminal of the ESM being connected to the neutral rail.

14. An electrical storage module (ESM), comprising:
    first and second energy cell strings connected in parallel relative to one another and configured to be connected to respective inputs of a bidirectional DC-DC converter;
    wherein the first and second energy cell strings are configured to absorb current from the bidirectional DC-DC converter when the bidirectional DC-DC converter operates in a buck mode, and
    the first and second energy cell strings are configured to source current to the bidirectional DC-DC converter when the bidirectional DC-DC converter operates in a boost mode
    wherein a current output by or input to the first and second energy cell strings is balanced by an interphase transformer of a bidirectional DC-DC converter.

15. The ESM as recited in claim 14, wherein at least one of the first and second energy cell strings include a plurality of energy cells selected from a group including fuel cells, batteries, and capacitors.

16. The ESM as recited in claim 14, wherein the fuel cells included in the respective at least one of the first and second energy cell strings are connected in series with one another.

17. The ESM as recited in claim 14, wherein the first energy cell string includes a plurality of energy cells connected in series with one another, wherein the second energy cell string includes a plurality of energy cells connected in series with one another, and wherein each of the energy cells is mounted on a printed circuit board assembly.

18. The ESM as recited in claim 17, wherein each of the energy cells includes a mid-size ultracapacitor.

19. A method of balancing current flow on a direct current bus, comprising:
    coupling first and second energy cell strings of an energy storage module (ESM) to respective first and second phase legs of a bidirectional DC-DC converter via an interphase transformer of the bidirectional DC-DC converter, the first and second energy cell strings being coupled in parallel relative to one another;
    controlling switching devices of the first and second phase legs to operate in either a boost mode or a buck mode;
    absorbing current in the ESM from the bidirectional DC-DC converter via the first and second energy cell strings when the bidirectional DC-DC converter is operated in the buck mode;
    sourcing current from the ESM to the bidirectional DC-DC converter via the first and second energy cell strings when the bidirectional DC-DC converter is operated in the boost mode; and
    operating on current output by or input to the first and second energy cell strings by the interphase transformer.

20. A method of balancing current flow on a direct current (DC) bus, comprising:
    coupling first and second energy cell strings of an energy storage module (ESM) to respective first and second phase legs of a bidirectional DC-DC converter, the first and second energy cell strings being coupled in parallel relative to one another, with the first energy cell being connected between a negative terminal and a first positive terminal of the ESM, and the second energy cell being connected between the negative terminal and a second positive terminal of the ESM;
    controlling switching devices of the first and second phase legs to operate in either a boost mode or a buck mode;
    absorbing current in the ESM from the bidirectional DC-DC converter when the bidirectional DC-DC converter is operated in the buck mode;
    sourcing current from the ESM to the bidirectional DC-DC converter when the bidirectional DC-DC converter is operated in the boost mode; and
    balancing current output by or input to the first and second energy cell strings by an interphase transformer.

* * * * *